US008482936B2

(12) United States Patent
Falk et al.

(10) Patent No.: US 8,482,936 B2
(45) Date of Patent: Jul. 9, 2013

(54) METHOD OF AND APPARATUS FOR CONNECTING A PHOTOVOLTAIC DEVICE TO AN AC POWER GRID

(75) Inventors: Andreas Falk, Kassel (DE); Joachim Laschinski, Kassel (DE); Oliver Arend, Lohfelden (DE); Peter Simon, Hessisch Lichtenau (DE); Wolfgang Reichenbaecher, Staufenberg (DE); Frank Greizer, Kaufungen (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 13/273,512

(22) Filed: Oct. 14, 2011

(65) Prior Publication Data

US 2012/0039101 A1 Feb. 16, 2012

Related U.S. Application Data

(63) Continuation of application No. PCT/EP2010/055042, filed on Apr. 16, 2010.

(30) Foreign Application Priority Data

Apr. 17, 2009 (EP) .................................... 09158156

(51) Int. Cl.
*H02M 5/42* (2006.01)
*H02M 3/24* (2006.01)

(52) U.S. Cl.
USPC ................. 363/17; 363/95; 363/98; 363/131; 363/132

(58) Field of Classification Search
USPC ................. 363/17, 95, 98, 131, 132
See application file for complete search history.

(56) References Cited

U.S. PATENT DOCUMENTS

| 4,674,024 | A | * | 6/1987 | Paice et al. ...................... 363/71 |
| 5,654,883 | A | * | 8/1997 | Takehara et al. ................ 363/79 |
| 5,682,305 | A | * | 10/1997 | Kurokami et al. .............. 363/79 |
| 6,072,707 | A | * | 6/2000 | Hochgraf ......................... 363/71 |
| 6,252,785 | B1 | * | 6/2001 | Hagihara et al. ................ 363/71 |
| 6,590,793 | B1 | * | 7/2003 | Nagao et al. .................... 363/95 |
| 7,269,036 | B2 | | 9/2007 | Deng et al. |
| 7,859,241 | B2 | * | 12/2010 | Yoshida et al. ............... 323/285 |
| 2005/0105224 | A1 | | 5/2005 | Nishi |
| 2007/0133241 | A1 | * | 6/2007 | Mumtaz et al. ............... 363/131 |
| 2009/0303763 | A1 | | 12/2009 | Yuguchi et al. |

FOREIGN PATENT DOCUMENTS

| DE | 112007000197 T5 | 10/2008 |
| JP | 2003289626 A | 10/2003 |
| JP | 08 126207 A | 2/2006 |

* cited by examiner

*Primary Examiner* — Bao Q Vu
(74) *Attorney, Agent, or Firm* — Eschweiler & Associates, LLC

(57) ABSTRACT

A method of connecting a photovoltaic device to an AC power grid through an inverter includes monitoring a DC voltage at an input of an inverter, and activating the inverter when the monitored DC voltage exceeds a first predetermined threshold. The method further includes synchronizing an output voltage of the inverter with a grid voltage, connecting an output of the inverter to the AC power grid upon synchronization if the monitored DC voltage exceeds second predetermined threshold, and deactivating the inverter if a detected power being fed through the inverter falls below a predetermined power threshold while maintaining the connection between the output of the inverter and the AC power grid. Lastly, the method includes disconnecting the output of the deactivated inverter from the grid if the monitored DC voltage falls below a third predetermined threshold. Further, an apparatus that performs such functionality is also provided.

24 Claims, 3 Drawing Sheets

METHOD OF AND APPARATUS FOR CONNECTING A PHOTOVOLTAIC DEVICE TO AN AC POWER GRID

REFERENCE TO RELATED APPLICATIONS

This application is a continuation of International application number PCT/EP2010/055042 filed Apr. 16, 2010, which claims priority to European application number EP 09158156.1 filed Apr. 17, 2009.

FIELD

The invention relates to a method of connecting a photovoltaic device to an AC power grid, and to an apparatus for performing such a method.

BACKGROUND

Generally, a photovoltaic device could remain connected permanently, i.e., from the beginning up to the end of its operation, to an AC power grid into which electric energy generated by the photovoltaic device is fed. This, however, would mean that at the time when the photovoltaic device, in case of decreasing insulation, no longer generates a sufficient counter-voltage, a current could flow from the AC power grid into the photovoltaic device. In consequence electric voltage would, for instance also during the night, be present at the photovoltaic device. To avoid absorption of electric energy out of the AC power grid and emergence of electric voltages at the photovoltaic device during the night, it has become a usual practice to disconnect photovoltaic devices from the AC power grid in the evening and to reconnect them again in the morning.

Connecting a photovoltaic device to an AC power grid in the morning shall, on the one hand, happen as early as possible in order to feed electric energy into the AC power grid as early as possible and, thus, to feed as much electric energy as possible into the AC power grid. Similarly, for the same reason, the disconnection from the AC power grid in the evening shall happen as late as possible. On the other hand, connection attempts that have to be discontinued because the photovoltaic device can still not yet provide the required electric power to feed electric energy into the grid should be as rare as possible. Each abortive attempt of connecting a photovoltaic device to an AC power grid means an additional switching cycle for the power switches via which the photovoltaic device is connected to the AC power grid, which are normally air gap switches. This forces to use high-quality air gap switches and to connect them in series with line safety switches, if such line safety switches shall be provided as safety means between the photovoltaic device and the AC power grid, which is the rule. Line safety switches generally have a much lower tolerance with regard to a high number of switching cycles than air gap switches.

In the known methods of and apparatuses for connecting a photovoltaic device to an AC power grid, the connection attempt is aborted and the power switches, via which the grid connection takes place, are reopened in the event of the DC current generated by the photovoltaic device no longer exceeding the minimum connection continuation voltage after connection with the AC power grid. Here, the minimum connection continuation voltage is often selected in such a way that it is the lowest limit for feeding electric energy from the photovoltaic device into the AC power grid.

From DE-T5-11 2007 000 197 a photovoltaic inverter for connecting a photovoltaic device to an AC power grid is known, in which a table comprising seasonal values of minimum connection attempt voltages is stored. When the DC voltage generated by the photovoltaic device reaches the current seasonal value of the minimum connection attempt voltage, a successful connection of the photovoltaic device to the AC power grid via the photovoltaic inverter should be possible. In this way, seasonal influences on the DC voltage of the photovoltaic device, which serves as a criterion for a sufficient performance of the photovoltaic device for a connection attempt, may be taken into account. Particularly, these seasonal influences result from the temperature in the morning, when the connection attempt is undertaken.

From U.S. Pat. No. 7,269,036 B2 a method of and an apparatus for connecting a photovoltaic device to an AC power grid is known, in which the time of connection of the photovoltaic device to the AC power grid in the morning is tuned in that a minimum connection attempt voltage is increased if a previous connection attempt based on the previous value of the minimum connection attempt voltage has failed.

In the two procedures described above, the basic conflict between on the one hand feeding an as high as possible amount of electric energy from the photovoltaic device into the AC power grid and on the other hand making an as low as possible number of abortive connection attempts is not overcome. Either the DC voltage generated by the photovoltaic device from which on a first connection is tried will be set comparatively low to feed as much electric energy from the photovoltaic device into the AC power grid as possible, or it will be set comparatively high to keep the number of finally abortive connection attempts small. Each form of tuning or adaptation of the minimum connection attempt voltage may at best help to better locate the range in which a particular minimum connection attempt voltage has to be set in consideration of both aforementioned criteria.

From JP 08 126207 A a method of connecting a photovoltaic device to an AC power grid is known, wherein a DC current generated by the photovoltaic device is measured, wherein upon reaching a connection voltage by the DC voltage an inverter, which converts the DC voltage into an output AC voltage, is activated and connected to the AC power grid, and wherein the inverter is disconnected from the AC power grid and deactivated again, when the DC voltage falls below a shut-down voltage that is above the peak value of the grid AC voltage.

SUMMARY

The invention is directed to a method of connecting a photovoltaic device to an AC power grid and an apparatus for performing such a method, in which the number of occurring switching cycles of the power switches used for connecting the photovoltaic device to the AC power grid is generally reduced.

In the new method of connecting a photovoltaic device to an AC power grid, the inverter is not disconnected from the AC power grid again before the DC voltage generated by the photovoltaic device falls below a maximum shut-down voltage, wherein this maximum shut-down voltage is not smaller than the peak value of the AC grid voltage and not higher than the minimum connection continuation voltage. As the maximum shut-down voltage is not below the peak value of the AC grid voltage, it avoids a current flow from the AC power grid via the inverter into the photovoltaic device. The maximum shut-down voltage is, in one embodiment, equal to the peak value of the AC grid voltage plus a small added safety margin of, for example, 1 to 10%, particularly 3 to 7%, i.e. about 5%.

In the new method the maximum shut-down voltage is, however, not dependent on any seasons, temperatures or previous connection attempts. As the AC grid voltage is regularly measured anyway, the maximum shut-down voltage may be adjusted continuously to an optimum value based on the result of this measurement. Due to the just small added safety margin of the maximum shut-down voltage on top of the peak value of the AC grid voltage, the maximum shut-down voltage is much lower than a DC voltage provided by the photovoltaic device at which according to the prior art a connection attempt is discontinued by reopening the power switches after a connection of the photovoltaic device to the AC power grid already has happened. Thus, the case of reopening the switches to the AC power grid only rarely occurs in the new method, ideally only once a day, in the evening. This particularly also applies, if the minimum connection attempt voltage, in view of feeding electric energy into the AC power grid as early as possible, is comparatively small, i.e. not much above the maximum shut-down voltage.

Instead of reopening the power switches to the AC power grid, the new method initially responds by deactivating the inverter connected to the AC power grid in case there is a decrease of the DC voltage generated by the photovoltaic device due to its performance still being too small.

This deactivation may be carried out when the DC voltage generated by the photovoltaic device falls below a minimum feeding DC voltage, which is, in one embodiment, below the maximum shut-down voltage and which is ideally selected in such a way that it avoids a transfer of electric power out of the AC power grid into the photovoltaic device even with an activated inverter that is connected to the AC power grid.

The inverter connected to the AC power grid is deactivated upon the DC voltage generated by the photovoltaic device falling below the minimum feeding DC voltage. If a continuous measurement of the power supplied by the inverter is done, the information whether the desired power flow direction from the photovoltaic device to the AC power grid is reversed may also directly be used as a criterion for deactivating the inverter connected to the grid, instead of selecting the minimum feeding DC voltage in such a way that electric power is prevented from flowing out of the AC power grid into the inverter.

By deactivating the inverter, the photovoltaic device is no longer loaded by an extraction of electric energy from it. Thus, the photovoltaic device is in a no-load operation in which it usually manages to at least keep the maximum shut-down voltage, if it has already reached the minimum connection attempt voltage once before. Only if the photovoltaic device does not even manage this, the inverter, which is already deactivated, will be disconnected from the AC power grid, even in the new method.

In the new method, it is accepted that a sine wave filter, which is typically connected downstream of the inverter, remains connected to the AC power grid while just the inverter is deactivated, and that reactive power oscillates between the sine wave filter and the AC power grid. In this way, the connection once achieved via the power switch is kept, and for starting anew the feeding of electric power into the AC power grid, it is just necessary to reactivate the inverter.

At the beginning of the connection attempt, the inverter that is not yet connected to the AC power grid will be deactivated again, if upon synchronization of the output AC voltage with the AC grid voltage the DC voltage falls below the connection attempt continuation voltage. In this case, the power of the photovoltaic device is not even sufficient to bear the little load that is required for the synchronization of the AC output voltage of the inverter with the AC grid voltage. Such an early aborted connection attempt does not yet stress the power switch to the AC power grid.

In one embodiment, a timing element is triggered in the new method when the inverter is deactivated prior to or after its connection to the AC power grid and/or when the inverter is disconnected from the grid, wherein the timing element avoids the reactivation or the reconnection of the inverter to the grid for a reasonable period of time.

In the new method, the minimum connection attempt voltage may be dependent on the season and/or the temperature of the photovoltaic device, or it may be set adaptively, based on experiences from a previous connection attempt. Even an adaptive tuning of the minimum connection attempt voltage in the new method still differs from the prior art of record in that the tuning is based on the experiences made when performing the last synchronization of the output voltage of the inverter with the AC grid voltage and, thus, on just a low load of the photovoltaic device but not on experiences made when actually closing the power switch to the AC power grid.

The minimum connection attempt voltage may, however, also be fixed or may be set as a fixed function of the AC grid voltage. Here, it has to be considered that a connection attempt is in fact only unsuccessful in the new method if not even the synchronization of the output voltage of the inverter with the AC grid voltage is successful. After that, the power switch to the AC power grid will be closed, which, due to the synchronization, may happen without a load or in practice at least nearly without a load. A following load of the photovoltaic device, which may result in a voltage drop, is exclusively due to feeding electric energy from the photovoltaic device into the AC power grid and may be reduced to zero by deactivating the inverter without the need of reopening the switch to the AC power grid.

Due to the considerable reduction in the number of actually occurring switching cycles of the power switch connecting the photovoltaic device to the AC power grid in a method according to the invention, the connection may be carried out via a motor-driven line safety switch in the new method, which, as compared to an air gap switch, has a much lower number of allowable switching cycles, i.e., a much shorter life time in switching cycles.

An apparatus according to the invention comprises a controller that does not earlier disconnect the inverter from the AC power grid than the DC voltage measured by a DC voltage measurement device is falling below a maximum shut-down voltage that is generated by the controller depending on the peak value of the AC grid voltage measured by an AC voltage measurement device.

In one embodiment, the controller generates the maximum shut-down voltage from the peak value of the AC grid voltage and an added safety margin whose percentage is programmed in the controller.

Further, in one embodiment if the controller deactivates the inverter depending on a power measurement device of the inverter, when the measurement value of the power fed by the inverter into the grid gets smaller than zero.

In a commercially particularly interesting embodiment of the new apparatus, each power switch that connects the inverter to the AC power grid is a motor-driven line safety switch. Even if such a line safety switch comprises only a comparatively low number of allowable switching cycles of about 10,000 to 20,000, a life time of the new apparatus of much more than 20 years is achieved in this way, since typically only one switching cycle per day is spent.

Further developments of the invention emerge from the claims, the description and the drawings. Advantages of features and of combinations of several features mentioned in the introductional part of the description are only exemplary and may come into effect alternatively or cumulatively, without the features necessarily being achieved by embodiments according to the invention. Further features may be taken from the drawings—particularly from the depicted geometries and the relative dimensions of several parts with regard to each other as well as from their relative arrangement and operational connection. The combination of features of different embodiments of the invention and of features of different patent claims is also possible deviating from the selected dependencies of the claims and is herewith motivated. This also relates to such features that are depicted in separate drawings or mentioned in their description. These features may also be combined with features of different claims. Similarly, features mentioned in the claims may also be omitted for further embodiments of the invention.

BRIEF DESCRIPTION OF THE DRAWINGS

In the following, the invention will be further explained and described by means of preferred embodiment examples depicted in the drawings.

DETAILED DESCRIPTION

Figure 1:
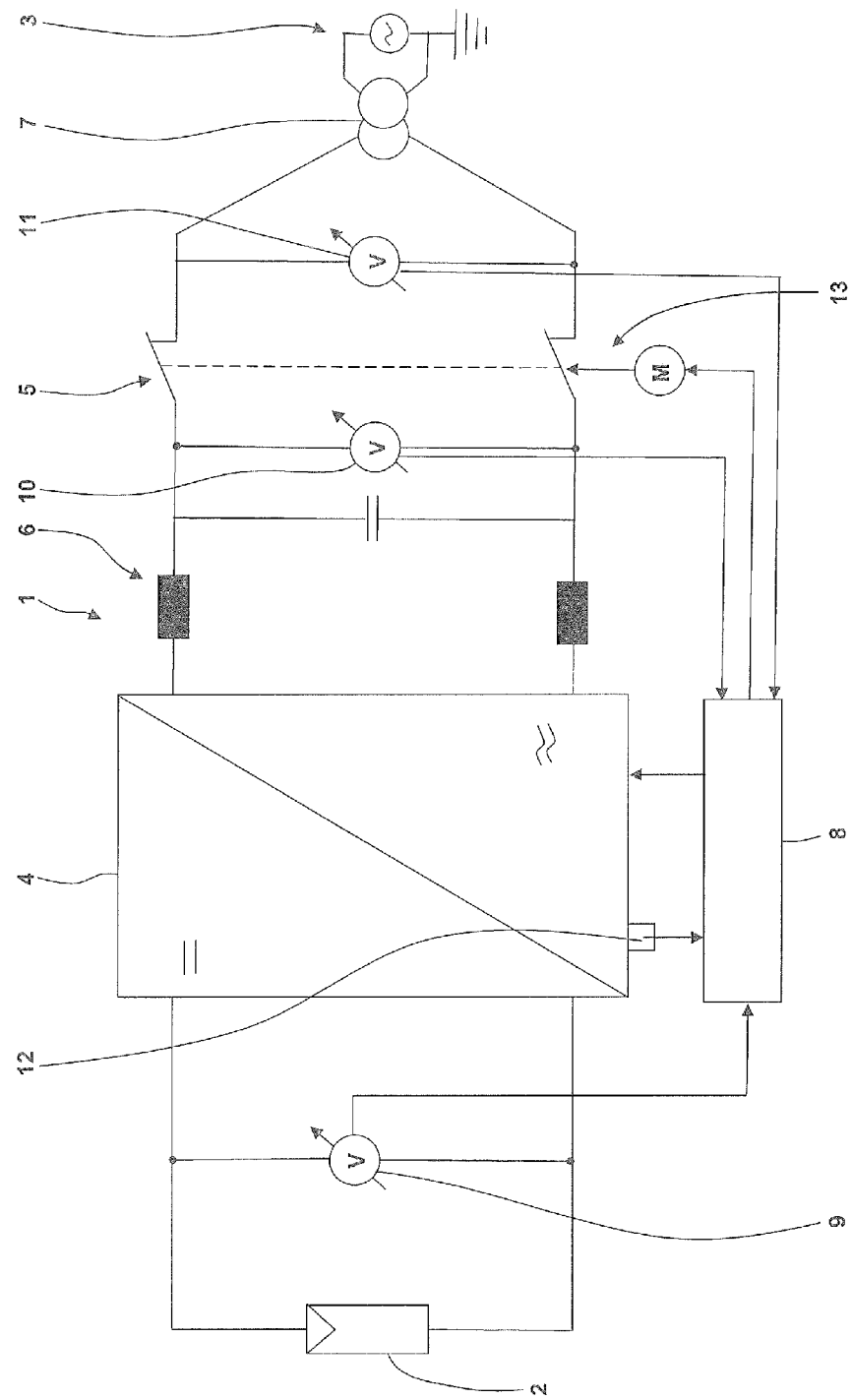
FIG. 1 illustrates the configuration of the new apparatus for connecting a photovoltaic device to an AC power grid in a first embodiment, the AC power grid being a single-phase grid.

The apparatus 1 illustrated in FIG. 1 serves for connecting a photovoltaic device 2 to an AC power grid 3. As an essential component, the apparatus 1 comprises an inverter 4 and a power switch 5, the power switch 5 being arranged between a sine wave filter 6 connected downstream of the inverter 4 and a transformer 7, which is provided for coupling electric power into the AC power grid 3 while at the same time providing a galvanic separation. The transformer 7 may also be omitted. The inverter 4 and the power switch 5 are operated by a controller 8. As input values, the controller 8 uses a DC voltage generated by the photovoltaic device 2, which is measured by a DC voltage measurement device 9, an output AC voltage of the inverter 4 after the sine wave filter 6, which is measured by an AC voltage measurement device 10, an AC grid voltage, which is measured by an AC measurement device 11, and the electric power flowing via the inverter 4, which is measured by a power measurement device 12. The AC voltage measurement devices 10 and 11 do not only measure the absolute values of the respective AC voltages but also their phases.

Now, the function of the apparatus 1 and particularly of its controller will be explained, starting from a situation at night, in which the photovoltaic device 2 does not generate DC voltage and the power switch 5 is opened so that the apparatus 1 is essentially free of voltages. Until the DC voltage, which is measured by the voltage measurement device 9, has achieved a minimum connection attempt voltage, the inverter 4 remains deactivated, and the power switch 5 remains open. When said minimum connection attempt voltage has been reached, the controller 8 activates the inverter 4, at first while the power switch 5 is still open. After that, the controller 8 synchronizes the AC output voltage, which is measured by the AC voltage measurement device 10 in terms of absolute value and phase, with the AC grid voltage, which is measured by the AC voltage measurement device 11, by means of operating the inverter 4 correspondingly. During that, the DC voltage generated by the photovoltaic device 2 is monitored for remaining above a minimum connection continuation voltage during the resulting small extraction of electric power from the photovoltaic device 2. If this is not the case, the connection attempt is cancelled and is started again under the same conditions after a predetermined period of time. If the DC voltage generated by the photovoltaic device 2 does not break down, the controller 8 closes the power switch 5 and thus connects the inverter 5 to the AC power grid. 3. Due to the synchronization of the AC output voltage with the AC grid voltage, this, at least nearly, happens without load, i.e., it does not mean an additional load to the photovoltaic device 2. Such an additional load occurs only afterwards when the inverter 4 is operated by the controller 8 in such a way that electric power from the photovoltaic device 2 is fed into the AC power grid 3. This electric power is measured by the power measurement device 12. If the performance of the photovoltaic device 2—for whatever reason—decreases to such an extent that no more power from the photovoltaic device 2 may be fed into the AC power grid 3 via the inverter 4, the controller 8 deactivates the inverter 4. However, it keeps the power switch 5 closed. Only if the peak value of the AC grid voltage, which is measured by the AC voltage measurement device 11, as compared to the remaining DC voltage generated by the photovoltaic device 2 is so high that the risk of a current flow via the inverter 4 into the photovoltaic device 2 exists, the controller 8 opens the power switch 5. As a rule, this is only the case in the evening, when the insulation of the photovoltaic device 2 decreases to such an extent that it should be disconnected from the AC power grid 3 for the night. The power switch 5 is opened upon the DC voltage generated by the photovoltaic device 2 falling below the maximum shut-down voltage. Typically, the maximum shut-down voltage is set by the controller 8 as the peak value of the AC grid voltage plus a percentage added safety margin of 5%, for example. Normally, the power switch 5 is thus opened and closed only once per day, i.e., it is stressed by only a single switching cycle. Due to this low load with switching cycles, the power switch 5 may—as here—be designed as a motor-driven line safety switch 13 and, thus, at the same time provide line safety function.

Figure 2:
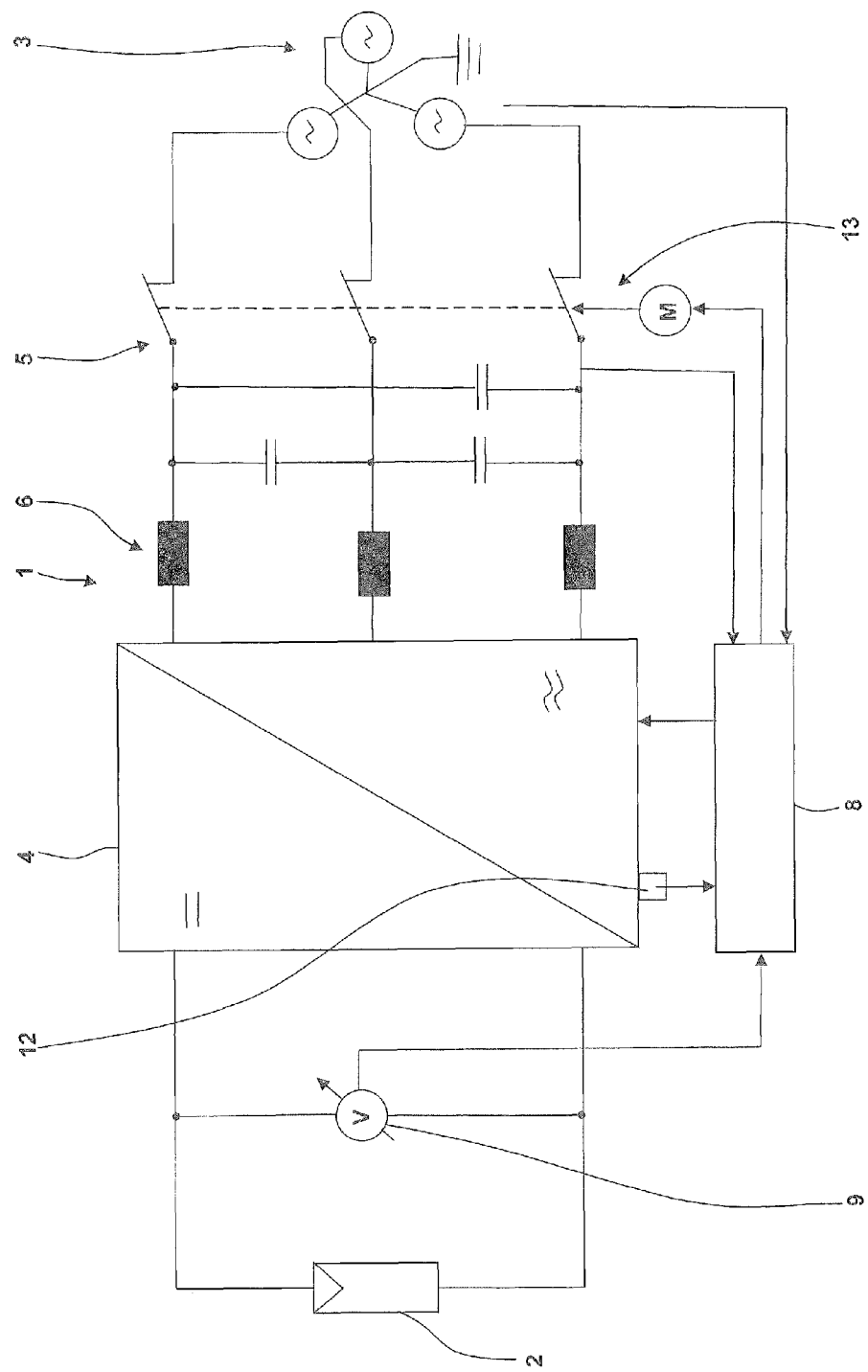
FIG. 2 illustrates the configuration of the new apparatus in a case in which the AC power grid is a three-phase grid.

The embodiment of the apparatus 1 according to FIG. 2 differs from the embodiment according to FIG. 1 only in that the inverter 4 feeds electric energy from the photovoltaic device 2 into a three-phase AC power grid 3 here, and in that no transformer is provided between the power switch 5 and the AC power grid 3. Here, a three-phase transformer, for example, a middle voltage transformer, may also be provided. The AC voltage measurement devices 10 and 11 are omitted only for reasons of clarity and are generally also provided here. For the formation of the apparatus 1 the details of the inverter 4 and also of the sine wave filter 9 as well as of the photovoltaic device 2 and even of the AC power grid 3 are not important. Further, additional switching and protection elements like switches, overvoltage suppressors and fuses between the photovoltaic device 2 and the inverter 4 and/or boost-/buck converters and the like may be provided.

Figure 3:
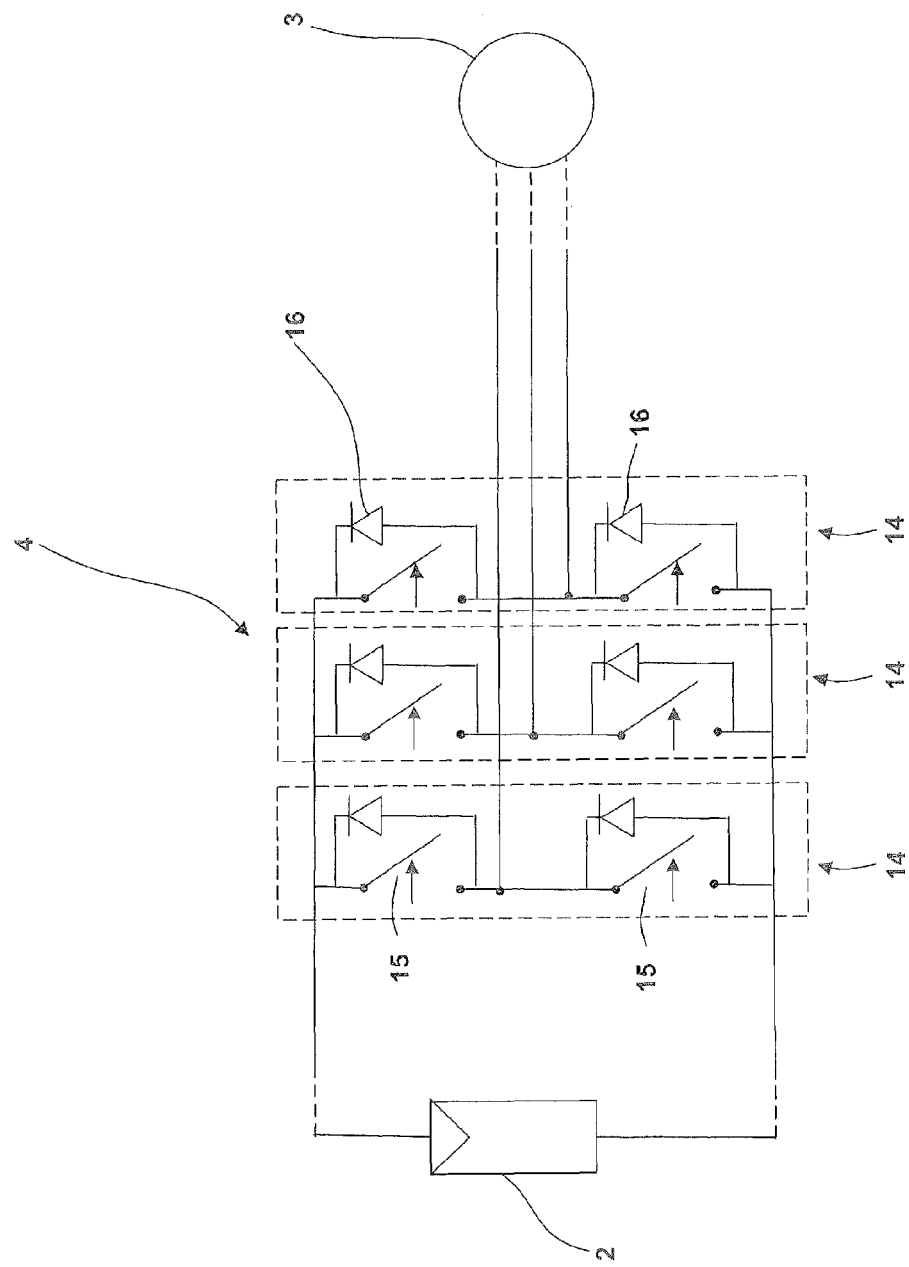
FIG. 3 illustrates the basic configuration of an inverter of the apparatus according to FIG. 2.

FIG. 3 illustrates a possible basic configuration of the inverter 4 according to FIG. 2. It comprises three half bridges 14 by each of which one phase of the three-phase AC power grid is alternately contacted to the two poles of the DC voltage generated by the photovoltaic device 2. Each half bridge 14 is made of two pulsed switches 15 to each of which a freewheeling diode 16 is connected in parallel. Via these freewheeling diodes 16 current may, in principle, flow in counterdirection from the AC power grid 3 to the photovoltaic device 2 as long as the inverter 4 is connected to the AC voltage grid, even if it is not activated, i.e., even if its switches 15 are not pulsed but are permanently open. This potential current flow with an inverter comprising free-wheeling diodes is avoided in the present invention in that the inverter 4 is disconnected from the AC power grid 3 again, when the DC voltage generated by the photovoltaic device 2 gets close to the peak value of the AC grid voltage.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure that performs the specified function of the described component (e.g., that is functionally equivalent), even though not structurally equivalent to the disclosed structure that performs the function in the herein illustrated exemplary implementations of the invention.

What is claimed is:

1. A method of connecting a photovoltaic device to an AC power grid through an inverter, comprising:
   monitoring a DC voltage at an input of an inverter;
   activating the inverter when the monitored DC voltage exceeds a first predetermined threshold;
   synchronizing an output voltage of the inverter with a grid voltage;
   connecting an output of the inverter to the AC power grid upon synchronization if the monitored DC voltage exceeds a second predetermined threshold;
   deactivating the inverter if a detected power being fed through the inverter falls below a predetermined power threshold while maintaining the connection between the output of the inverter and the AC power grid; and
   disconnecting the output of the deactivated inverter from the grid if the monitored DC voltage falls below a third predetermined threshold.

2. The method of claim 1, wherein the first predetermined threshold comprises a minimum connection attempt voltage.

3. The method of claim 1, wherein the second predetermined threshold comprises a minimum connection continuation voltage.

4. The method of claim 1, wherein the third predetermined threshold comprises a maximum shut down voltage.

5. The method of claim 4, wherein the maximum shut down voltage comprises a peak value of the AC grid voltage plus a safety margin.

6. The method of claim 5, wherein the safety margin comprises an amount in the range of 1% to 10% of the peak value of the AC grid voltage.

7. The method of claim 1, wherein the predetermined power threshold corresponds to a minimum DC feeding voltage from the photovoltaic device into the inverter.

8. The method of claim 7, wherein the minimum DC feeding voltage is greater than the third predetermined threshold.

9. The method of claim 1, further comprising deactivating the inverter during an attempted synchronization of the inverter output voltage and the AC grid voltage if the monitored DC voltage falls below the second predetermined threshold.

10. The method of claim 1, further comprising waiting a first predetermined period of time before attempting to reactivate the inverter upon a deactivation of the inverter.

11. The method of claim 1, further comprising waiting a second predetermined period of time before attempting to re-connect the inverter to the AC power grid upon a disconnection thereof.

12. The method of claim 1, wherein disconnecting the inverter from the AC power grid is performed with at least one motor-driven line safety switch.

13. An apparatus for connecting a photovoltaic device to an AC power grid, comprising:
   an inverter configured to receive a DC voltage at an input and generate an AC voltage at an output; and
   a controller configured to activate the inverter if the DC voltage at the inverter input exceeds a first predetermined threshold;
   wherein the controller is further configured to synchronize an AC output voltage of the inverter with an AC voltage of the power grid after the inverter is activated, and further configured to connect the inverter output to the AC power grid upon synchronization if the DC voltage at the inverter input exceeds a second predetermined threshold,
   wherein the controller is configured to deactivate the inverter if a detected power being fed through the inverter falls below a predetermined power threshold while maintaining the connection between the output of the inverter and the AC power grid; and
   wherein the controller is configured to disconnect the output of the inverter from the AC power grid if the DC voltage falls below a third predetermined threshold.

14. The apparatus of claim 13, wherein the first predetermined threshold comprises a minimum connection attempt voltage.

15. The apparatus of claim 13, wherein the second predetermined threshold comprises a minimum connection continuation voltage.

16. The apparatus of claim 13, wherein the third predetermined threshold comprises a maximum shut down voltage.

17. The apparatus of claim 16, wherein the maximum shut down voltage comprises a peak value of the AC grid voltage plus a safety margin.

18. The apparatus of claim 17, wherein the safety margin comprises an amount in the range of 1% to 10% of the peak value of the AC grid voltage.

19. The apparatus of claim 13, wherein the predetermined power threshold corresponds to a minimum DC feeding voltage from the photovoltaic device into the inverter.

20. The apparatus of claim 19, wherein the minimum DC feeding voltage is greater than the third predetermined threshold.

21. The apparatus of claim 13, wherein the controller is further configured to deactivate the inverter during an attempted synchronization of the inverter output voltage and the AC grid voltage if the monitored DC voltage falls below the second predetermined threshold.

22. The apparatus of claim 13, wherein the controller is configured to wait a first predetermined period of time before attempting to reactivate the inverter upon a deactivation of the inverter.

23. The apparatus of claim 13, wherein the controller is configured to wait a second predetermined period of time before attempting to re-connect the inverter to the AC power grid upon a disconnection thereof.

24. The apparatus of claim 13, further comprising at least one motor-driven line safety switch configured to disconnect the output of the inverter from the AC power grid, wherein the at least one motor-driven line safety switch is controlled by the controller.

* * * * *